United States Patent
Kim et al.

(10) Patent No.: US 11,742,707 B2
(45) Date of Patent: Aug. 29, 2023

(54) BOBBIN STRUCTURE FOR PARTIONING COIL LAYERS

(71) Applicants: HYUNDAI MOTOR COMPANY, Seoul (KR); KIA CORPORATION, Seoul (KR)

(72) Inventors: Jae Eun Kim, Hwaseong-si (KR); Tae Won Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/518,201

(22) Filed: Nov. 3, 2021

(65) Prior Publication Data
US 2022/0337102 A1   Oct. 20, 2022

(30) Foreign Application Priority Data
Apr. 15, 2021   (KR) .................. 10-2021-0048894

(51) Int. Cl.
*H02K 1/16*   (2006.01)
*H02K 11/00*  (2016.01)

(52) U.S. Cl.
CPC .............. *H02K 1/16* (2013.01); *H02K 11/00* (2013.01); *H02K 2203/12* (2013.01)

(58) Field of Classification Search
CPC .......... H02K 1/16; H02K 1/165; H02K 11/00; H02K 2203/12; H02K 3/34; H02K 3/345
USPC .................... 310/216.001, 216.104, 216.105
See application file for complete search history.

(56) References Cited

U.S. PATENT DOCUMENTS

| | | | |
|---|---|---|---|
| 10,333,364 B2* | 6/2019 | Pal | H02K 3/345 |
| 2017/0047803 A1* | 2/2017 | Scherer | H02K 15/0018 |
| 2018/0093698 A1* | 4/2018 | Urimoto | H02K 15/0062 |
| 2020/0161918 A1* | 5/2020 | Almeida E Silva | B60K 1/00 |
| 2021/0036568 A1* | 2/2021 | Schulz | H02K 3/12 |
| 2021/0167657 A1* | 6/2021 | Koga | H02K 3/12 |
| 2021/0249926 A1* | 8/2021 | Enomoto | H02K 15/024 |

* cited by examiner

*Primary Examiner* — Rashad H Johnson
(74) *Attorney, Agent, or Firm* — LEMPIA SUMMERFIELD KATZ LLC

(57) ABSTRACT

A bobbin structure is inserted into a slot defined in a stator core. The bobbin structure includes a body configured to contact an inner wall of the slot and at least one partition provided inside the body to insulate at least some coils, inserted into the slot so as to be arranged in a plurality of layers, from each other. The body and the at least one partition are formed integrally with each other.

8 Claims, 4 Drawing Sheets

STACK DIRECTION
OF STATOR CORE

STACK DIRECTION OF STATOR CORE

BOBBIN STRUCTURE FOR PARTIONING COIL LAYERS

CROSS-REFERENCE TO RELATED APPLICATION

This application claims under 35 U.S.C. § 119(a) the benefit of priority to Korean Patent Application No. 10-2021-0048894 filed on Apr. 15, 2021, the entire contents of which are incorporated herein by reference.

BACKGROUND

(a) Technical Field

The present disclosure relates to a bobbin structure. More particularly, it relates to a bobbin structure, which may perform insulation between a stator core and coils and insulation between the coils.

(b) Background Art

In order to improve performance and fuel efficiency of electric vehicles (EVs) and hybrid electric vehicles (HEVs), which use electricity as a main power supply, development of driving motors is required. In order to improve performance of a driving motor, the number of turns of coils wound on a stator core or the efficiency of the driving motor must be increased. In order to increase the efficiency of the driving motor, insulation of the stator motor is important.

Improvement in the insulation performance of the driving motor is required depending on whether high voltage is applied to the driving motor. More particularly, insulation between the stator core and coils and insulation between the coils are important in improving the insulation performance of the driving motor. Partial discharge may occur due to a voltage difference between the stator core and the coils and a voltage difference between the coils. Also, when the discharge constituently occurs, a film coated on the coils is damaged and thus the insulation performance of the driving motor is deteriorated. Voltage at which partial discharge starts to occur is referred to partial discharge inception voltage (PDIV) and the PDIV is lowered as altitude and temperature are raised. In other words, in a situation in which high voltage is applied to the driving motor, when a vehicle is traveling at a place having a high elevation or the temperature of the driving motor is raised due to continuous use of the driving motor, the performance of the driving motor may be deteriorated.

In general, in order to prevent direct contact between the stator core and the coils inserted into slots of the stator core of the driving motor and to restrain partial discharge, an insulating paper is inserted therebetween. The insulating paper is inserted into the slots during a process of inserting the coils into the slots and the insulating paper is difficult to bend and process. Further, a general driving motor is not capable of reflecting a two-stage voltage distribution, such as an open-end winding (OEW) structure, and thus has low insulation performance between coils inserted into slots.

SUMMARY

The present disclosure has been made in an effort to solve the above-described problems associated with the prior art. It is an object of the present disclosure to provide a bobbin structure, which may perform insulation between a stator core and coils and insulation between the coils.

It is another object of the present disclosure to provide a bobbin structure, which may improve insulation between coils in preparation for high voltage applied to each phase of the coils generated when a driving motor is applied to an open-end winding (OEW) structure.

In one aspect, the present disclosure provides a bobbin structure inserted into a slot defined in a stator core. The bobbin structure includes a body configured to contact an inner wall of the slot and at least one partition provided inside the body to insulate at least some of coils, inserted into the slot so as to be arranged in a plurality of layers, from each other. The body and the at least one partition are formed integrally with each other.

In an embodiment, the coils may be provided to an inside of the slot so as to be arranged in six layers and the at least one partition may be disposed between a first layer and a second layer or disposed between a fifth layer and a sixth layer.

In another embodiment, the coils may be provided to an inside of the slot so as to be arranged in six layers. The at least one partition may include two partitions. One of the two partitions may be disposed between a first layer and a second layer and a remaining one may be disposed between a fifth layer and a sixth layer.

In still another embodiment, the bobbin structure may be formed of plastic.

In yet another embodiment, the stator core may include a plurality of teeth. The bobbin structure may further include an extension disposed at one of both ends of the body based on a stack direction of the stator core and the extension may be disposed so as to contact two adjacent teeth.

In still yet another embodiment, the extension may extend from the body in a direction perpendicular to the stack direction of the stator core and the extension may extend in an arrangement direction of the teeth.

In a further embodiment, the extension may be disposed on the teeth based on the stack direction of the stator core.

In another further embodiment, the coils may be provided to an inside of the slot so as to be arranged in six layers. A plurality of slots may be defined in the stator core. The bobbin structure may be provided as one of a first type configured such that the at least one partition is disposed between a first layer and a second layer and a second type configured such that the at least one partition is disposed between a fifth layer and a sixth layer and may be applied to each of the slots. The first type and the second type may be alternately applied to the slots.

In still another further embodiment, the bobbin structure may be applied to a driving motor connected to a first inverter and a second inverter and configured such that one end of each of stator lead lines, in which a three-phase current flows, is connected to an output line of the first inverter and a remaining end of each of the stator lead lines is connected to an output line of the second inverter.

The above and other aspects, features, and embodiments of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
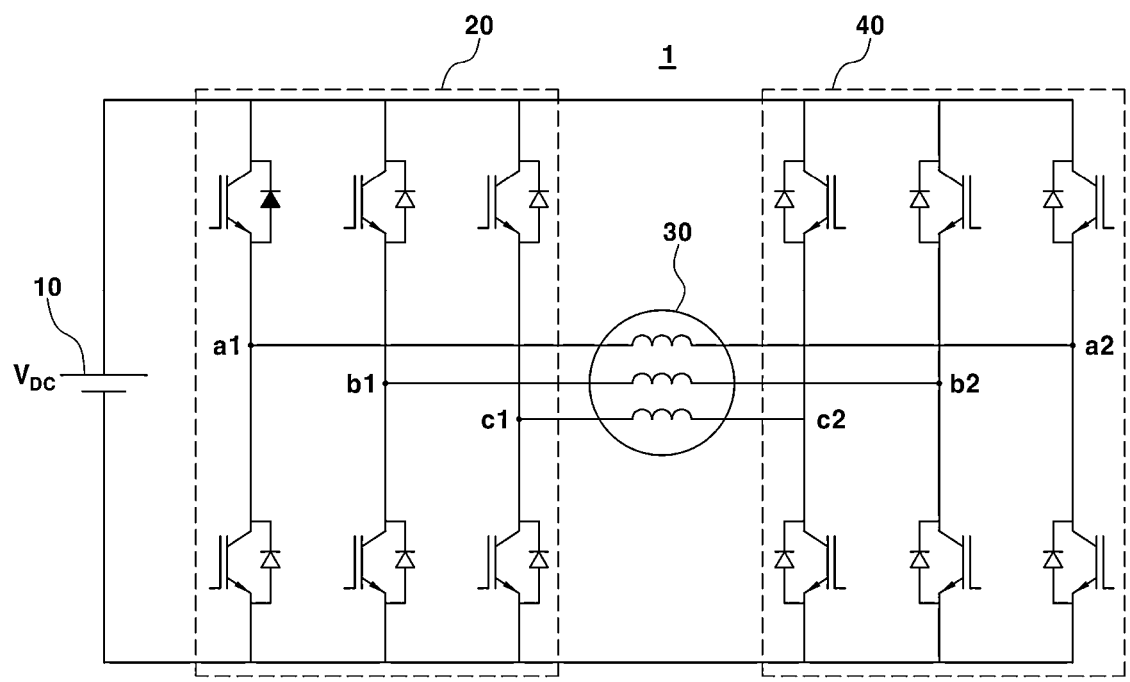
FIG. 1 is a circuit diagram illustrating a driving system of a motor according to one embodiment of the present disclosure.

It should be understood that the appended drawings are not necessarily to scale, presenting a somewhat simplified representation of various features illustrative of the basic principles of the disclosure. The specific design features of the present inventive concept as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving the same should become apparent from the descriptions of embodiments given herein below with reference to the accompanying drawings. However, the present disclosure is not limited to the embodiments disclosed herein and may be implemented in various different forms. The embodiments are provided to make the description of the present disclosure thorough and to fully convey the scope of the present disclosure to those having ordinary skill in the art. It is to be noted that the scope of the present disclosure is defined only by the claims. In the following description of the present disclosure, the same or similar elements are denoted by the same reference numerals even when they are depicted in different drawings.

Further, in the following description of the embodiments, terms, such as "first" and "second", are used only to distinguish one element from other elements. These terms should not be construed as being limiting with regard to the sequence thereof.

Hereinafter, reference is made in detail to various embodiments of the present disclosure, examples of which are illustrated in the accompanying drawings and described below. While the disclosure is described in conjunction with several embodiments, it should be understood that the present description is not intended to limit the disclosure to the embodiments described herein. On the contrary, the disclosure is intended to cover not only the embodiments described, but also various alternatives, modifications, equivalents, and other embodiments, which may be included within the spirit and scope of the disclosure as defined by the appended claims. In addition, the claims disclosed herein are to be interpreted as encompassing other embodiments.

When a component, device, element, or the like of the present disclosure is described as having a purpose or performing an operation, function, or the like, the component, device, or element should be considered herein as being "configured to" meet that purpose or to perform that operation or function.

FIG. 1 is a circuit diagram illustrating a driving system of a motor according to one embodiment of the present disclosure.

Referring to FIG. 1, a driving system 1 may be driven in the state in which one AC driving motor 30 and two inverters 20 and 40 are connected in an open-end winding (OEW) manner. Voltage applied to the driving motor 30 when the driving system 1 is configured in the OEW manner may be higher than voltage applied to the driving motor 30 in the state in which the driving motor 30 and one inverter 20 are connected in a closed-end winding (CEW) manner.

The driving system 1 may include a battery 10, a first inverter 20, the AC driving motor 30, a second inverter 40, and a switch 50.

The battery 10 may be an energy storage device, which supplies power to drive a motor in an eco-friendly vehicle provided with the AC driving motor 30 configured to generate driving force to rotate wheels, such as an electric vehicle or a plug-in hybrid electric vehicle. The battery 10 applied to the eco-friendly vehicle may be discharged when the AC driving motor 30 is driven and may be charged with power supplied from an external system.

The inverters 20 and 40 may be bidirectional inverters, which are selectively operated so as to convert DC power into AC power having a plurality of different phases, or so as to convert AC power having a plurality of phases into DC power and then to output the DC power to the battery 10. In other words, the inverters 20 and 40 may drive or regenerate the AC driving motor 30 through six switching elements included in each of the inverters 20 and 40.

The first inverter 20 may have a power input terminal connected to the battery 10 and may have first input/output terminals a1, b1 and c1 connected to the AC driving motor 30. When the AC driving motor 30 is driven, the first inverter 20 may receive power of the battery 10 through the power input terminal, convert the power into AC power having a plurality of phases using the switching elements, and output the AC power through the first input/output terminals a1, b1 and c1. Because technology in which an AC driving motor is driven using power having three phases having a phase difference of 120 degrees therebetween is generally applied, various embodiments of the present disclosure are described based on the inverters 20 and 40 configured to perform three-phase power conversion and the three-phase AC driving motor 30.

The AC driving motor 30 may be driven by three-phase AC power converted by the inverters 20 and 40. The AC driving motor 30 may include a plurality stator coils configured to receive AC power having different phases, i.e., the three-phase AC power, from the first inverter 20.

The second inverter 40 may have second input/output terminals a2, b2, and c2 connected to the AC driving motor 30. The second inverter 40 may control reactive power of the AC driving motor 30. In other words, the second inverter 40 compensates for a reactive power component required by the first inverter 20, and thereby, the first inverter 20 may enlarge a steady output section in response to voltage limitation in a high-speed driving mode (i.e., a high output mode of a vehicle).

In general, in a structure of the driving system 1 in which one inverter is applied (hereinafter referred to as a Y-connection structure), a voltage difference between the phases of the driving motor 30 is $$\frac{V_{dc}}{\sqrt{3}}.$$

However, in the OEW structure in which two inverters are applied, a voltage difference between the phases of the driving motor 30 is $V_{dc}$. In other words, the OEW structure may apply relatively high voltage to each phase of the driving motor 30 compared to the Y-connection structure. Because relatively high voltage is applied to each phase of the driving motor 30, importance of insulation between a stator core (not shown) and coils (not shown) and insulation between the coils (not shown) may be increased.

Figure 2:
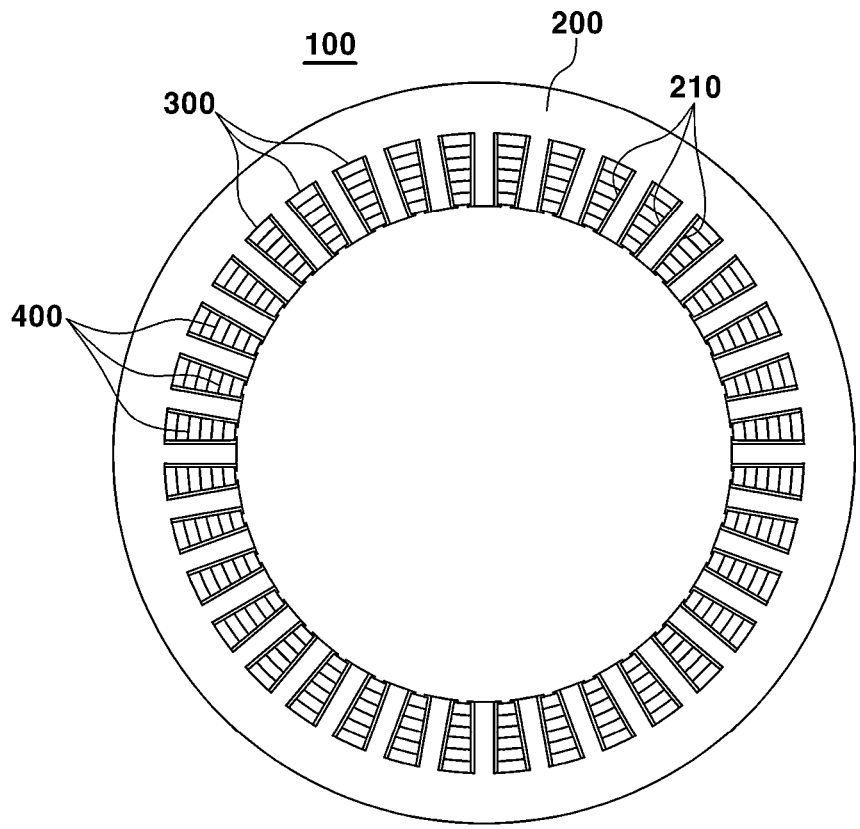
FIG. 2 is a view illustrating a stator according to one embodiment of the present disclosure.

FIG. 2 is a view illustrating a stator according to one embodiment of the present disclosure.

Referring to FIGS. 1 and 2, a stator 100 may include a stator core 200, bobbin structures 300, and coils 400. The stator core 200 may have a plurality of teeth and a plurality of slots 210 may be defined by the teeth. The bobbin structures 300 may be respectively inserted into the slots 210. The coils 400 may be wound on the bobbin structures 300. The coils 400 may be provided as six layers in one slot 210. The bobbin structures 300 may insulate the stator core 200 and the coils 400 from each other.

The stator 100 according to one embodiment of the present disclosure may be applied to the driving motor 30 applied to the OEW structure in which two inverters are used. The bobbin structure 300 may be applied to the driving motor 30, which is connected to the first inverter 10 and the second inverter 20 and is configured such that one end of each of stator lead lines, in which three-phase current flows, is connected to an output line of the first inverter 10 and the other end of each of the stator lead lines is connected to an output line of the second inverter 20. Here, stator lead lines mean the coils 400 provided to the stator core 200 or three-phase (U-, V- and W-phase) lead lines in which the coils 400 are collected. In the driving motor 30 applied to the OEW structure, there is a voltage difference between the coils 400 inserted into the slot 210 so as to be arranged in the six layers. For example, in one slot 210, there may be the maximum voltage difference between the coil 400 located in the first layer and the coil 400 located in the second layer. In another slot 210 adjacent to the slot 210, there may be the maximum voltage difference between the coil 400 located in the fifth layer and the coil 400 located in the sixth layer. Therefore, in order to perform insulation between the coils 400, the bobbin structure 300 according to the present disclosure may include a separate partition (not shown) disposed between the coils 400. The partition (not shown) is described below.

Figure 3:
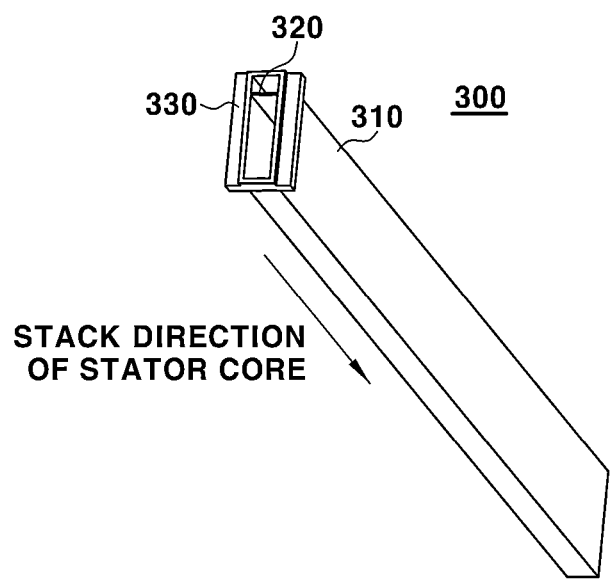
FIG. 3 is a perspective view illustrating a bobbin structure according to one embodiment of the present disclosure.
Figure 4:
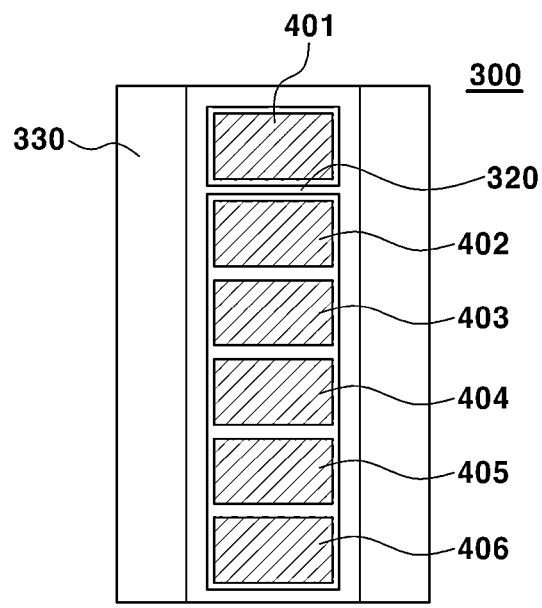
FIG. 4 is a view illustrating the bobbin structure according to one embodiment of the present disclosure, into which coils are inserted.

FIG. 3 is a perspective view illustrating the bobbin structure according to one embodiment of the present disclosure. FIG. 4 is a view illustrating the bobbin structure according to one embodiment of the present disclosure, into which the coils are inserted.

Referring to FIGS. 2-4, the bobbin structure 300 may include a body 310, a partition 320, and an extension 330. The body 310, the partition 320, and the extension 330 may be formed of a plastic material. The body 310, the partition 320, and the extension 330 may be formed integrally through an injection molding process.

The body 310 may contact the inner wall of the slot 210. The body 310 may extend in the stack direction of the stator core 200. The body 310 may be inserted into the slot 210, thereby being capable of insulating the coils 400 and the stator core 200 from each other.

At least one partition 320 may be provided in the body 310. The coils 400 may be inserted into the body 310 so as to be arranged in a plurality of layers. That is to say, the coils 400 may be inserted into the slot 210 so as to form a plurality of layers. The partition 320 serves to perform insulation between the coils 400 arranged in the layers. The partition 320 may be provided in the body 310 so as to insulate at least some of the coils 400 inserted into the slot 320 so as to be arranged in the respective layers from each other. The coils 400 may include a first coil 401 located in the first layer, a second coil 402 located in the second layer, a third coil 403 located in the third layer, a fourth coil 404 located in the fourth layer, a fifth coil 405 located in the fifth layer, and a sixth coil 406 located in the sixth layer. The partition 320 may be disposed between the first coil 401 located in the first layer and the second coil 402 located in the second layer so as to insulate the first coil 401 and the second coil 402 from each other. In the OEW structure, the first coil 401 and the second coil 402 are coils which have a relatively great voltage difference and the performance of the driving motor may be improved through insulation between the first coil 401 and the second coil 402.

The extension 330 may be disposed at one of both ends of the body 310 in the stack direction of the stator core 200. When the bobbin structure 300 is inserted into the slot 210 in the stack direction of the stator core 200, the extension 330 may determine the position of the bobbin structure 300 and may prevent separation of the bobbin structure 30 from the slot 210. The extension 330 may extend from the body 310 in a direction perpendicular to a direction in which the first to sixth coils 401, 402, 403, 404, 405, and 406 are successively arranged. The extension 330 may extend from both ends of the body 310 in the direction perpendicular to the direction in which the first to sixth coils 401, 402, 403, 404, 405, and 406 are successively arranged.

In contrast to the above-described example, the partition 320 may be disposed between the fifth coil 405 located in the fifth layer and the sixth coil 406 located in the sixth layer so as to insulate the fifth coil 405 and the sixth coil 406 from each other.

According to one embodiment of the present disclosure, the bobbin structure 300 may insulate the stator core 200 and the coils 401, 402, 403, 404, 405, and 406 from each other and insulate the first coil 401 and the second coil 402, which have a relatively great voltage difference, among the coils 401, 402, 403, 404, 405, and 406 from each other. Conventionally, an insulating paper was used to insulate a stator core and coils from each other and to insulate coils, which have a relatively great voltage difference, among these coils from each other. However, in this case, it was difficult to process the insulating paper. On the other hand, the bobbin structure 300 according to one embodiment of the present disclosure is an injection molded product and thus there is little difficulty in processing the bobbin structure 300. Therefore, a process in the manufacturing equipment of the stator 100 may be simplified. Further, the bobbin structure 300 may be a plastic injection molded product, and thus, have lower material costs than the insulating paper.

Figure 5:
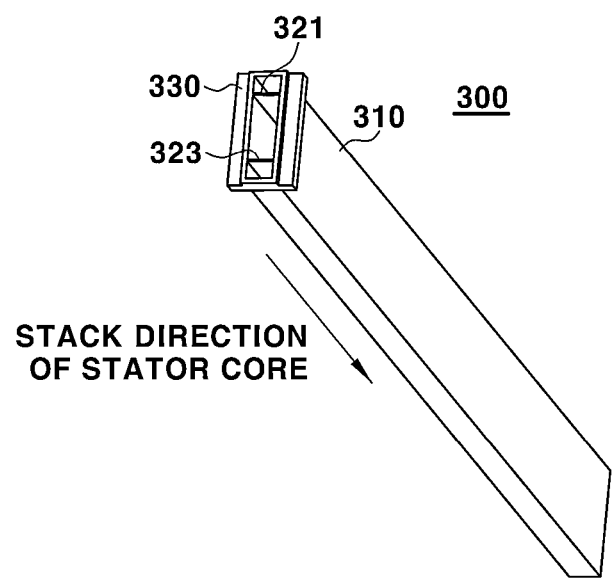
FIG. 5 is a perspective view illustrating a bobbin structure according to another embodiment of the present disclosure.
Figure 6:
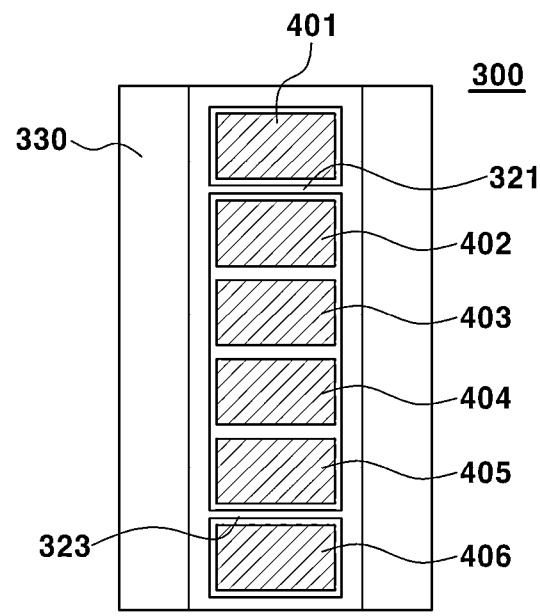
FIG. 6 is a view illustrating the bobbin structure according to another embodiment of the present disclosure, into which coils are inserted.

FIG. 5 is a perspective view illustrating a bobbin structure according to another embodiment of the present disclosure. FIG. 6 is a view illustrating the bobbin structure according to another embodiment of the present disclosure, into which coils are inserted. To provide a brief description, the detailed description of some parts in this embodiment, which are substantially the same as those in the former embodiment are omitted because it is considered to be unnecessary.

Referring to FIGS. 2, 5, and 6, a bobbin structure 300 may include a body 310, partitions 321 and 323, and an extension 330. The body 310, the partitions 321 and 323, and the extension 330 may be formed of a plastic material. The body 310, the partitions 321 and 323, and the extension 330 may be formed integrally through an injection molding process.

Two partitions 321 and 323 may be provided in the body 310. The partitions 321 and 323 may serve to insulate coils 400 provided in a plurality of layers. The coils 400 may include a first coil 401 located in the first layer, a second coil 402 located in the second layer, a third coil 403 located in the third layer, a fourth coil 404 located in the fourth layer, a fifth coil 405 located in the fifth layer, and a sixth coil 406 located in the sixth layer. The partitions 321 and 323 may include a first partition 321 disposed between the first coil 401 located in the first layer and the second coil 402 located in the second layer and may include a second partition 323 disposed between the fifth coil 405 located in the fifth layer and the sixth coil 406 located in the sixth layer. Therefore, the partitions 321 and 323 may insulate the first coil 401 and the second coil 402 from each other and may insulate the fifth coil 405 and the sixth coil 406 from each other.

In the OEW structure, a voltage difference between the first coil 401 and the second coil 402, inserted into one slot 210, may be greater than a voltage difference between other coils 400. Further, a voltage difference between the fifth coil 405 and the sixth coil 406, inserted into another slot 210 adjacent to the slot 210, may be greater than a voltage difference between other coils 400. Therefore, in order to simplify the manufacturing process of the bobbin structure 300 and the assembly process of the stator 100, the bobbin structure 300 including the first partition 321 disposed between the first coil 401 and the second coil 402 and the second partition 323 disposed between the fifth coil 405 and the sixth coil 406 may be applied to a driving motor.

Figure 7:
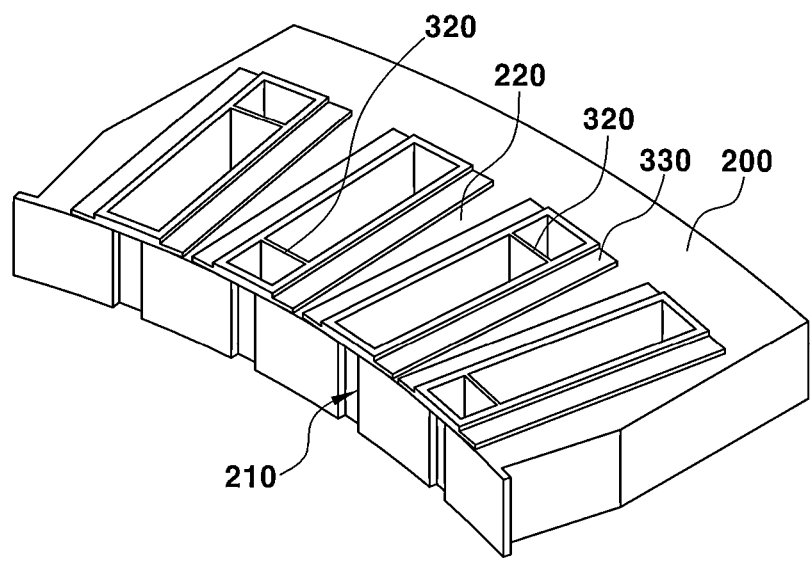
FIG. 7 is a view illustrating a state in which a bobbin structure according to one embodiment of the present disclosure is inserted into each of slots of a stator core.

FIG. 7 is a view illustrating a state in which a bobbin structure according to one embodiment of the present disclosure is inserted into each of slots of a stator core. FIG. 7 illustrates only a part of the stator core.

Referring to FIG. 7, a plurality of teeth 220 may be defined in a stator core 200 and a plurality of slots 210 may be defined by the teeth 220. Bobbin structures 300 may be respectively inserted into the slots 210. Here, the bobbin structures 300 may be divided into a first type and a second type depending on a direction in which the bobbin structure 300 is inserted into the slot 210.

For example, the first-type bobbin structure 300 may be a type in which the partition 320 is disposed between the first layer and the second layer. The second-type bobbin structure 300 may be a type in which the partition 320 is disposed between the fifth layer and the sixth layer. Relatively, the first-type bobbin structure 300 may be a type in which the partition 320 is disposed adjacent to the stator core 20 and the second-type bobbin structure 300 may be a type in which the partition 320 is disposed adjacent to the ends of the teeth 220 extending from the stator core 200. The first-type bobbin structure 300 and the second-type bobbin structure 300 are different only in the direction in which the first-type or second-type bobbin structure 300 is inserted into the slot 210 and may be structurally identical. The first-type bobbin structure 300 and the second-type bobbin structure 300 may be alternately applied to the slots 210.

The extension 330 may be disposed so as to contact two adjacent teeth 210. The extension 330 may extend from the body (310 in FIG. 3 or 5) in a direction perpendicular to the stack direction of the stator core 200. The extension 330 may extend in a direction in which the teeth are arranged. The extension 330 may be disposed on the teeth 220 based on the stack direction of the stator core 200. The extension 330 may prevent the bobbin structure 300 from being released from the slot 210. Further, because the extension 330 may be applied only to one of both ends of the body (310 in FIG. 3 or 5), the bobbin structure 300 may be easily inserted into the slot 210.

As should be apparent from the above description, a bobbin structure according to one embodiment of the present disclosure may be processed with little difficulty as compared to the conventional structure in which an insulating paper is used to insulate a stator core and coils from each other and to insulate the coils from each other. Therefore, a process in the manufacturing equipment of a stator may be simplified. Further, the bobbin structure is a plastic injection molded product, and thus, has lower material costs than the insulating paper.

The bobbin structure according to one embodiment of the present disclosure is optimized for a stator applied to an open-end winding (OEW) structure. The bobbin structure is thereby capable of easily implementing the insulation structure of the stator and thus increasing the efficiency of a driving motor.

The disclosure has been described in detail with reference to embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A bobbin structure inserted into a slot defined in a stator core, the bobbin structure comprising:
    a body configured to contact an inner wall of the slot; and
    a single partition provided inside the body to insulate at least some coils, inserted into the slot to be arranged in a plurality of layers, from each other,
    wherein the body and the single partition are formed integrally with each other,
    wherein the coils are provided to an inside of the slot to be arranged in six layers, and
    wherein the single partition is disposed between a first layer and a second layer or disposed between a fifth layer and a sixth layer.

2. The bobbin structure of claim 1, wherein the bobbin structure is formed of plastic.

3. The bobbin structure of claim 1, wherein:
    the stator core comprises a plurality of teeth; and
    the bobbin structure further comprises an extension disposed at one of both ends of the body based on a stack direction of the stator core,
    wherein the extension is disposed to contact two adjacent teeth.

4. The bobbin structure of claim 3, wherein:
    the extension extends from the body in a direction perpendicular to the stack direction of the stator core; and
    the extension extends in an arrangement direction of the teeth.

5. The bobbin structure of claim 3, wherein the extension is disposed on the teeth based on the stack direction of the stator core.

6. The bobbin structure of claim 1, wherein
    the bobbin structure is applied to a driving motor connected to a first inverter and a second inverter and configured such that one end of each of stator lead lines, in which current of three-phases flows, is connected to an output line of the first inverter and a remaining end of each of the stator lead lines is connected to an output line of the second inverter.

7. A bobbin structure inserted into a slot defined in a stator core, the bobbin structure comprising:
    a body configured to contact an inner wall of the slot; and at most two partitions provided inside the body to insulate at least some coils, inserted into the slot to be arranged in a plurality of layers, from each other,
wherein the body and the at most two partitions are formed integrally with each other,
wherein the coils are provided to an inside of the slot to be arranged in six layers, and
wherein one of the at most two partitions is disposed between a first layer and a second layer, and a remaining one of the at most two partitions is disposed between a fifth layer and a sixth layer.

8. A bobbin structure inserted into a slot defined in a stator core, the bobbin structure comprising:
a body configured to contact an inner wall of the slot; and
at least one partition provided inside the body to insulate at least some coils, inserted into the slot to be arranged in a plurality of layers, from each other,
wherein the body and the at least one partition are formed integrally with each other,
wherein the coils are provided to an inside of the slot to be arranged in six layers,
wherein a plurality of slots are defined in the stator core,
wherein the bobbin structure is provided as one of a first type configured such that the at least one partition is disposed between a first layer and a second layer and a second type configured such that the at least one partition is disposed between a fifth layer and a sixth layer and is applied to each of the slots, and
wherein the first type and the second type are alternately applied to the slots.

* * * * *